United States Patent Office 3,480,390
Patented Nov. 25, 1969

3,480,390
PROCESS FOR PRODUCING FINELY-DIVIDED
PRECIPITATED SILICON DIOXIDE
Helmut Reinhardt, Hansenweg 7, Frankfurt am Main,
Germany, Peter Nauroth, Germanusstrasse 8, Wesseling, Bezirk Cologne, Germany, and Karl Achenbach,
Dieburgerstrasse 8, Frankfurt am Main, Germany
No Drawing. Filed Jan. 11, 1966, Ser. No. 519,958
Claims priority, application Germany, Jan. 13, 1965,
D 46,237
Int. Cl. C01b 33/00
U.S. Cl. 23—182                               4 Claims

ABSTRACT OF THE DISCLOSURE

Finely-divided silicon dioxide with high surface area is obtained by simultaneously introducing an alkali silicate solution and an acid solution into a suitable reaction vessel.

---

The invention relates to a process for producing finely-divided silicon dioxide by reacting alkali silicate solutions and further relates to acid solutions with the simultaneous introduction of the alkali sliicate and acid solutions in a receiving vessel, whereby a finely-divided silica with primary particles of several millimicrons and a surface area of the lowest values up to 800 m.$^2$/g. according to BET is obtained and a pronounced particle growth is avoided.

The raw materials, water glass and mineral acid are usually employed for the production of silica gel and finely-divided silica. While for the production of a gel an unstable sol is first obtained by working with an excess of acid (usually $H_2SO_4$ or HCl) and by adding the water glass, the process is just the opposite for obtaining finely-divided silica. Here, the water glass is usually produced and the flocculation is obtained by adding acids (also flue gas $CO_2$). According to another known process, acid and water glass are allowed to run into a solution separately; said solution being kept neutral during the reaction (7–7.5 pH). Easily dispersed substances form in the alkali medium down to pH 7, while very adhesive particles which form into hard balls are formed in the case of the acid gel precipitation.

A number of other processes for the recovery of finely-divided silica are known. In order to obtain an improved precipitability, for example, of the finely-divided silica, a mineral acid is added to an alkali silicate solution in the presence of neutral salts of strong acids and strong bases, such as sodium chloride or sodium sulfate. Moreover, the process is such, for example, that given minimum salt concentrations are maintained in the solution and precipitation is executed in such a way that the ratio of the initial salt concentration to the final salt concentration is between 1:1.5 or 1:5.0. According to another process, a solution of neutral electrolytes is used as the base solution; both reaction components are introduced simultaneously but at different places in the solution. Moreover, the electrolyte quantities should be at least 1% at the beginning of the precipitation and at least 5% of the total reaction mixture during precipitation. Insofar as precipitation takes place in such a way that the water introduced with the reaction components does not cause any change in the concentration with respect to the admixed electrolytes in the reaction mixture, the reaction solution can be used again and again in a continuous process after the silica which has formed is separated.

It is also known to control the rate at which the acid is added to the base water glass as a function of temperature, alkali silicate concentration and electrolyte concentration of the initial solution when silica fillers with given adjustable specific particle surfaces are produced and to execute precipitation up to a pH value of approximately 5. Moreover, the reaction temperature can be up to 90° C. A heat treatment at temperatures of 120 to 140° C. or a further acid treatment with the addition of aluminum sulfate has been suggested for stabilizing such silica products. Moreover, the acid treatment can be continued until the $Na_2O$ content in the silica is reduced to below 1%.

A process for producing a silica gel built up on growth nuclei is executed in such a way that a decomposed silica sol is heated to approximately 60° C. to recover nuclei from silica hydrate of high molecular weight and said solution of nuclei is then mixed with the aqueous suspension of a silica solution which is precipitated from an alkali silicate solution with mineral acid at a pH from 8 to 10.7.

Many of said processes, particularly the latter, are cumbersome and do not offer any absolute guarantee of the uniform precipitation of the filler particles with respect to the size and condition of the surface. Moreover, the described continuous method of working cannot always be used with satisfactory results, because the permanent transfer of the electrolyte-containing precipitate which contains already precipitated particles which are carried along causes a premature aging of the new precipitation and thus has an unfavorable influence on the texture of the precipitated particles.

According to a more recent proposal, a satisfactorily stable, aging-insensitive, extremely finely-divided and highly active silicon dioxide can be obtained easily in a single precipitation process, if the precipitation of alkali silicate solution and acid solution is executed as a function of the viscosity behavior of the reaction medium. With said process, the alkali silicate solution and the acid solution are fed simultaneously into an aqueous alkali solution of a pH value up to pH 10. According to the invention, the viscosity of the reaction medium is kept uniformly low for a period of at least 30% of the total precipitation period. The addition of the reaction components to the reaction medium is ended only when the viscosity, after passing a maximum, is redduced to a value which is less than 100% higher than the initial viscosity.

According to said process, a pure silicon dioxide with a particle size of between 0.01 and 0.03 micron and a specific surface area above 200 m.$^2$/g., specifically between 240 and 260 m.$^2$/g. measured according to the BET method. The specific surface area can be reduced, for example, to 100 to 150 m.$^2$/g. by means of a temperature treatment. After drying and grinding, the products can be easily dispersed and well distributed in elastomers.

Said known processes resulting in products with actually defined surfaces which, however, must be kept low, as is known, because their primary use is as fillers in elastomers. However, disadvantages frequently accompany said methods of working, such as those previously described. Here a pronounced particle growth, which is observed with the produced water glass, cannot be avoided and represents a particular problem. Furthermore, it is not possible to obtain products with higher BET-surface values, for example, of more than 400 m.$^2$/g.

The basic goal of the invention, therefore, is to provide a process for the production of finely-divided silicon dioxide by reacting alkali silicate solutions with acid solutions with the simultaneous introduction of the alkali silicate and acid solutions in a receiving vessel, separation of the water and drying, said process making possible the production of highly dispersed silica with primary particles of several millimicrons and a surface of the lowest values up to 800 m.²/g. BET and avoiding a pronounced particle growth completely.

The characteristic feature of the invention is the fact that the precipitation is preferably executed in an acid medium in which water glass and acid are simultaneously introduced into standard pure water with accurate control of the quantity produced, concentration of the reaction components, reaction period, temperature, and pH value in order to obtain definite surface areas and pore diameters. Here "pure water" refers to tap water, industrial water and water purified by ion exchangers, as well as distilled water. However, this does not include water "contaminated" by the precipitation components, water glass and acid.

It was found that finely-divided silica can be precipitated in an acid medium between pH 2 and 7, if water glass and acid are simultaneously introduced into pure water with the accurate control of the following precipitation conditions: amount in receiving vessel, concentration of the reaction components, temperature, reaction period, and pH value.

Said process makes possible the production of finely-divided silica with primary particles of several millimicrons and surface of the lowest values up to approximately 800 m.²/g. according to BET. A pronounced particle growth, which is observed during working with standard water glass, does not occur in the case of the acid precipitation. Additives of neutral salts or organic flocculating agents are unnecessary. There is also no need of a fluoride additive.

The following table shows the dependence of the surface area upon the pH value during precipitation:

| pH | 3 | 4 | 5 | 6 | 8 |
|---|---|---|---|---|---|
| Surface area (m.²/g.) | 290 | 236 | 190 | 132 | 40 |

During this series of experiments, the usual parameters which are responsible for the activity of the silicas were kept constant. The precipitation temperature was 70° C.; the precipitation period was 90 minutes; the receiver medium or pool consisted of 2 liters water and the final concentration was 55 g. $SiO_2$/l.

A careful combination of the other parameters is necessary for the quantitative precipitation at low pH values (2–4). Here higher values must be used for time, temperature and concentration.

Inclusions of acid and difficult-to-remove salts are avoided by eliminating the gel state.

Moreover, a better dispersibility is obtained with the same particle size in comparison to the gel precipitation. Thus, said silicas are easier to clean and do not give any disturbing after-taste when they are used to purify liquids which contain albumin, for example, fruit juices, beer, etc.

Silicas which are produced according to the described method are also very well-suited as adsorption agents and carrier substances for catalysts or active materials. Moreover, the effectiveness is all the better, the larger the surface area.

The present invention relates to a process for producing finely-divided precipitated silicon dioxide by reacting alkali silicate solutions with acid solutions with the simultaneous feeding of the reaction components into a receiving vessel, followed by separation of the water and drying. The present invention is characterized by the fact that the precipitation is preferably executed in an acid medium, while the alkali silicate solution and the acid are allowed to flow simultaneously into a vat with pure water; the vat quantity, concentration of the reaction components, reaction period, temperature, and pH value being accurately controlled in order to obtain definite surface areas and pore diameters. In one embodiment, the process of the present invention is characterized by the fact that the alkali silicate solution is a sodium silicate solution with a concentration up to approximately 100 grams $Na_2O$ per liter and the acid solution is a sulfuric acid solution with a concentration up to 98 precent. The solutions are allowed to flow into a vat with pure water with the pH value controlled at from approximately pH 2 to approximately pH 10, and the temperature in the reaction medium is kept between approximately 25° C. and approximately 100° C.

EXAMPLE I

In order to carry out the process according to the invention, 150 liters of water, the temperature of which is 50° C., is placed in a container which holds 500 liters thereby providing a pool of water. Then, at 50° C., a diluted sodium silicate solution of the specific gravity 1.086 and a 10% sulfuric acid solution are fed simultaneously into the receiving container within 25 minutes. The feed rate of the acid is approximately 0.30 to 0.35 that of the alkali silicate solution. A pH value between approximately 5 to 5.5 is maintained. Feeding lasts approximately 25 minutes. The pH is electrically controlled.

The silicon dioxide which is obtained after the separation of the water and after drying is extremely finely-divided and has a specific surface area of approximately 670 m.²g. whereby the particle size ranges between 3 and 10 millimicrons and the average pore diameter is approximately 50 A.

Other acid-reacting substances can be used for the precipitation instead of sulfuric acid. Examples of same are carbon dioxide and hydrochloric acid.

In a practical example of the application of the invention for increasing the albumin stability of beer, it was found that the removal of albumin substances of a higher molecular weight, which are responsible for clouding, increases with an increasing surface, while the low molecular albumin substances (isohumulone) are not adsorbed. A decrease in the average pore diameter usually runs parallel with an increasing surface. Preferably, substances with pore diameters <60 A. and surfaces of more than 400 m.²/g. are used.

The following results were obtained by analyzing the residue albumin in beer according to Esbach:

| | Precipitation limit | $SiO_2$-surface (m.²/g.) |
|---|---|---|
| Blank test (control beer) | 0.55 | |
| | 0.85 | 422 |
| | 0.95 | 482 |
| | 1.00 | 563 |

EXAMPLE II 22 kilograms of a silica which is produced according to the invention and which has a specific surface of 630 m.²/g. and an average pore diameter of approximately 50 A. were dispersed in 50 liters of beer with a high-speed stirrer. Said silica suspension was fed, by means of proportioning pump, to 220 hectoliters of beer at the cellar temperature during pumping from one vat into another vat. A good distribution of the silica in the beer was obtained in this way and by this method. After the silica settled, the beer was further processed in a known way, in that it was cleared by filtering it through a filter press and filters.

The ammonium sulfate precipitation limit of the unprocessed beer was 1.35. After treatment with said silica, it increased to 2.95. The stability of the foam was 55 seconds and the analysis of the isohumulones was approximately 25 milligrams per liter before and after processing.

The specific adsorption of given substances is probably determined by the chemical nature of the surface of the adsorbing substances and the chemical composition of the adsorbate.

What is claimed is:

1. A process of preparing finely-divided silicon dioxide having a surface area of at least 400 square meters per gram, as measured by the Brunauer-Emmett-Teller method, comprising establishing a pool of pure water and simultaneously introducing an alkali silicate solution and an acid solution into said pool, the ratio of said alkali silicate solution to said acid solution being such that the pH is maintained substantially constant and within the range of pH 2 to pH 6, separating the silicon dioxide from the water and drying the silica.

2. The process of claim 1, wherein the alkali silicate solution comprises a sodium silicate solution having a concentration of up to approximately 100 grams $Na_2O$ per liter, and the acid solution comprises sulfuric acid having a concentration of up to 98 percent, and wherein the temperature within said pool is maintained substantially constant and within the range of between approximately 25° C. and 100° C.

3. The process of claim 1, wherein the final concentration in the aqueous mixture is about 55 grams $SiO_2$ per liter.

4. The method as defined in claim 1, wherein the alkali silicate solution is a sodium silicate solution having a specific gravity of about 1.086, the acid solution is about a 10% sulfuric acid solution, the pH is maintained between 5 and 5.5, and the temperature of said pool is about 50° C.

References Cited

UNITED STATES PATENTS

| | | | |
|---|---|---|---|
| 2,940,830 | 6/1960 | Thornhill | 23—182 |
| 3,235,331 | 2/1966 | Nauroth et al. | 23—182 |

FOREIGN PATENTS

| | | |
|---|---|---|
| 946,433 | 8/1956 | Germany. |
| 1,168,874 | 4/1964 | Germany. |

EDWARD J. MEROS, Primary Examiner

U.S. Cl. X.R.

99—48; 210—24

PO-1050
(5/69)

UNITED STATES PATENT OFFICE
CERTIFICATE OF CORRECTION

Patent No. 3,480,390  Dated November 25, 1969

Inventor(s) Helmut Reinhardt, Peter Nauroth and Karl Achenbach

It is certified that error appears in the above-identified patent and that said Letters Patent are hereby corrected as shown below:

Page 1, column 1, line 7, after "Germany" insert:

---, assignors to Deutsche Gold- und Silber-Acheideanstalt vormals Roessler, Frankfurt am Main, Germany, a corporation of Germany---.

SIGNED AND
SEALED
MAR 10 1970

(SEAL)
Attest:

Edward M. Fletcher, Jr.
Attesting Officer

WILLIAM E. SCHUYLER, JR.
Commissioner of Patents